United States Patent
Bourlon

(10) Patent No.: US 11,143,252 B2
(45) Date of Patent: Oct. 12, 2021

(54) DRIVER FOR ELECTROMECHANICAL BRAKE CALIPER PISTON, COMPRISING A NON-FRICTION FACE

(71) Applicant: FOUNDATION BRAKES FRANCE, Drancy (FR)

(72) Inventor: Philippe Bourlon, Dammartin en Goele (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 87 days.

(21) Appl. No.: 16/466,120

(22) PCT Filed: Dec. 5, 2017

(86) PCT No.: PCT/FR2017/053393
§ 371 (c)(1),
(2) Date: Jun. 3, 2019

(87) PCT Pub. No.: WO2018/104649
PCT Pub. Date: Jun. 14, 2018

(65) Prior Publication Data
US 2020/0063810 A1  Feb. 27, 2020

(30) Foreign Application Priority Data

Dec. 7, 2016 (FR) ..................... 16 62066

(51) Int. Cl.
*F16D 65/12* (2006.01)
*F16D 65/00* (2006.01)
(Continued)

(52) U.S. Cl.
CPC ....... *F16D 65/0068* (2013.01); *F16D 55/226* (2013.01); *F16D 65/183* (2013.01);
(Continued)

(58) Field of Classification Search
CPC ...... B60T 13/741; F16D 55/226; F16D 65/18; F16D 65/0068; F16D 2121/04; F16D 2121/24
(Continued)

(56) References Cited

U.S. PATENT DOCUMENTS 4,036,330 A * 7/1977 Henning ............... F16D 55/224
188/72.8
4,522,286 A * 6/1985 Villata .................... F16D 65/18
188/72.7
(Continued)

FOREIGN PATENT DOCUMENTS

CN  101907142 A  12/2010
CN  102966686 A  3/2013
(Continued)

OTHER PUBLICATIONS

Office Action and translation for Chinese application No. 201780075710.2 dated Apr. 9, 2020.
(Continued)

*Primary Examiner* — Christopher P Schwartz
(74) *Attorney, Agent, or Firm* — Pearne & Gordon LLP

(57) ABSTRACT

An electromechanical brake caliper comprising a caliper body comprising a housing containing a piston and a member for driving a mechanism for moving the piston. The driving member comprises a threaded body and a head comprising a face supported on a bottom of the housing, the supported face being provided with a non-friction coating.

8 Claims, 1 Drawing Sheet

(51) Int. Cl.
  *F16D 55/226* (2006.01)
  *F16D 65/18* (2006.01)
  *F16D 55/00* (2006.01)
  *F16D 121/14* (2012.01)
  *F16D 125/40* (2012.01)

(52) U.S. Cl.
  CPC .. *F16D 2055/0016* (2013.01); *F16D 2121/14* (2013.01); *F16D 2125/40* (2013.01); *F16D 2200/0004* (2013.01); *F16D 2200/0034* (2013.01); *F16D 2250/0084* (2013.01)

(58) Field of Classification Search
  USPC ............ 188/71.1–71.9, 72.1–72.9, 156–164
  See application file for complete search history.

(56) References Cited

U.S. PATENT DOCUMENTS

| | | | |
|---|---|---|---|
| 7,007,775 B2 | 3/2006 | Kapaan et al. | |
| 7,942,247 B2* | 5/2011 | Adachi | F16D 65/18 188/72.6 |
| 9,340,190 B2* | 5/2016 | Qian | B60T 1/065 |
| 2006/0289253 A1* | 12/2006 | DeMorais | F16D 55/226 188/218 R |
| 2014/0095042 A1 | 4/2014 | Sakashita et al. | |
| 2014/0158480 A1* | 6/2014 | Qian | B60T 1/065 188/72.6 |
| 2015/0300433 A1* | 10/2015 | Yasui | F16D 65/18 188/162 |
| 2017/0184556 A1 | 6/2017 | Toffoli et al. | |
| 2018/0362009 A1 | 12/2018 | Bourlon et al. | |
| 2019/0001950 A1 | 1/2019 | Bourlon | |
| 2019/0118789 A1 | 4/2019 | Bourlon et al. | |
| 2019/0145505 A1* | 5/2019 | Bourlon | F16D 65/18 188/72.8 |

FOREIGN PATENT DOCUMENTS

| | | |
|---|---|---|
| CN | 203161909 U | 8/2013 |
| CN | 103711817 A | 4/2014 |
| DE | 102009012016 A1 | 9/2010 |
| FR | 3013240 A1 | 5/2015 |
| JP | 2014-101960 A | 6/2014 |

OTHER PUBLICATIONS

International Search Report for International Application No. PCT/FR2017/053393 dated Mar. 22, 2018.
Written Opinion for International Application No. PCT/FR2017/053393 dated Mar. 22, 2018.
Preliminary French Search Report for French Application No. 16 62066 dated Aug. 2, 2017.
Office action for Chinese patent application No. 201780075710.2 dated Dec. 21, 2020.
Office action for Chinese patent application No. 201780075710.2 dated Apr. 9, 2021 and the English translation thereof.

* cited by examiner

DRIVER FOR ELECTROMECHANICAL BRAKE CALIPER PISTON, COMPRISING A NON-FRICTION FACE

TECHNICAL FIELD

The invention relates to a drive member for a piston equipping a disc-brake caliper with electromechanical actuator.

PRIOR ART

An electromechanical disc brake comprises a caliper straddling a brake disc, this caliper comprising a caliper body that carries two pads on either side of the disc and is equipped with an electromechanical actuator for pressing these pads against the disc when it is activated, in order to generate a braking torque.

The caliper body comprises a cylindrical housing extending between the actuator and one of the pads, in which a movable piston having its head in abutment on this pad slides. The actuator comprises an output shaft coupled to a driver or a drive member forming part of a connection of the helical type situated in the cylindrical housing and partly in the piston, in order to be interposed between the actuator and the piston head.

When the actuator is activated, it exerts a torque via its output shaft, which is transformed into a pressing force by a helical-connection mechanism, so that the piston presses the pad on the disc. The caliper is generally mounted floating in the axial direction of the disc, so that the pressing force exerted by a single piston suffices to press the two opposing pads against the disc.

In such a system, the helical connection is irreversible: a force exerted on the piston does not result in the exercising of a torque by the drive screw. This connection comprises a socket in which the driver or drive member is screwed, housed in the piston and connected thereto by a connection of the prismatic type, that is to say enabling the socket to slide longitudinally in the piston but preventing rotation thereof with respect to the piston. The piston slides in its housing while being locked with respect to rotation with respect to the caliper body.

When the actuator is activated, which generally corresponds to a parking-brake command, the socket in abutment against the internal face of the piston head pushes the piston towards the disc. Independently, a hydraulic pressurising of the piston housing, generally corresponding to a service-brake command, also presses this piston towards the disc.

The driver of the helical connection comprises a head that is in abutment against a bottom of the housing of the caliper body by means of a ball or roller thrust bearing. The socket moves away from this head when the driver turns in a direction of clamping of the brake, and it moves towards it when it turns in a direction of releasing the brake.

In this context, the document JP 2014/101960 describes a brake caliper integrating a swivel connection optimising the coaxiality of the driver with the cylindrical housing, and which in general terms has a complex structure requiring a large number of components.

The aim of the invention is to provide a solution for reducing the manufacturing cost of the drive mechanism of the piston of an electromechanical brake.

DISCLOSURE OF THE INVENTION

To this end, the subject matter of the invention is an electromechanical-brake caliper comprising a caliper body comprising a housing enclosing a piston and a drive member of a mechanism for moving this piston, this drive member comprising a threaded body and a head comprising a face for abutment against a bottom of the housing, and wherein the bottom and/or the abutment face is provided with a non-friction coating.

With this solution, the manufacturing cost of the caliper is reduced by eliminating its ball thrust bearing The deposition of a non-friction coating directly on the bearing face of the head of the drive member reduces the number of components and makes it possible to apply the coating most suited to the specific operating environment of the drive member.

The invention also relates to a caliper thus defined, the bottom of which is one face of a wall of the caliper body closing the housing of this caliper body, this wall comprising a central hole through which one end of the drive member passes, the central hole and the bottom each being provided with a non-friction coating.

The invention also relates to a caliper thus defined, wherein the non-friction coating is a coating of the fluoropolymer type.

The invention also relates to a caliper thus defined, comprising a metal washer interposed between the bearing face of the head of the drive member and the bottom of the housing.

The invention also relates to a disc brake comprising a caliper thus defined.

The invention also relates to a drive member of a mechanism for moving an electromechanical-brake piston, this member comprising a head comprising a bearing face provided with a non-friction coating.

The invention also relates to a method for assembling a caliper thus defined, comprising a step of introducing, into the housing of the caliper body, an assembly comprising the piston and its drive member.

DETAILED DISCLOSURE OF PARTICULAR EMBODIMENTS

Figure 1:
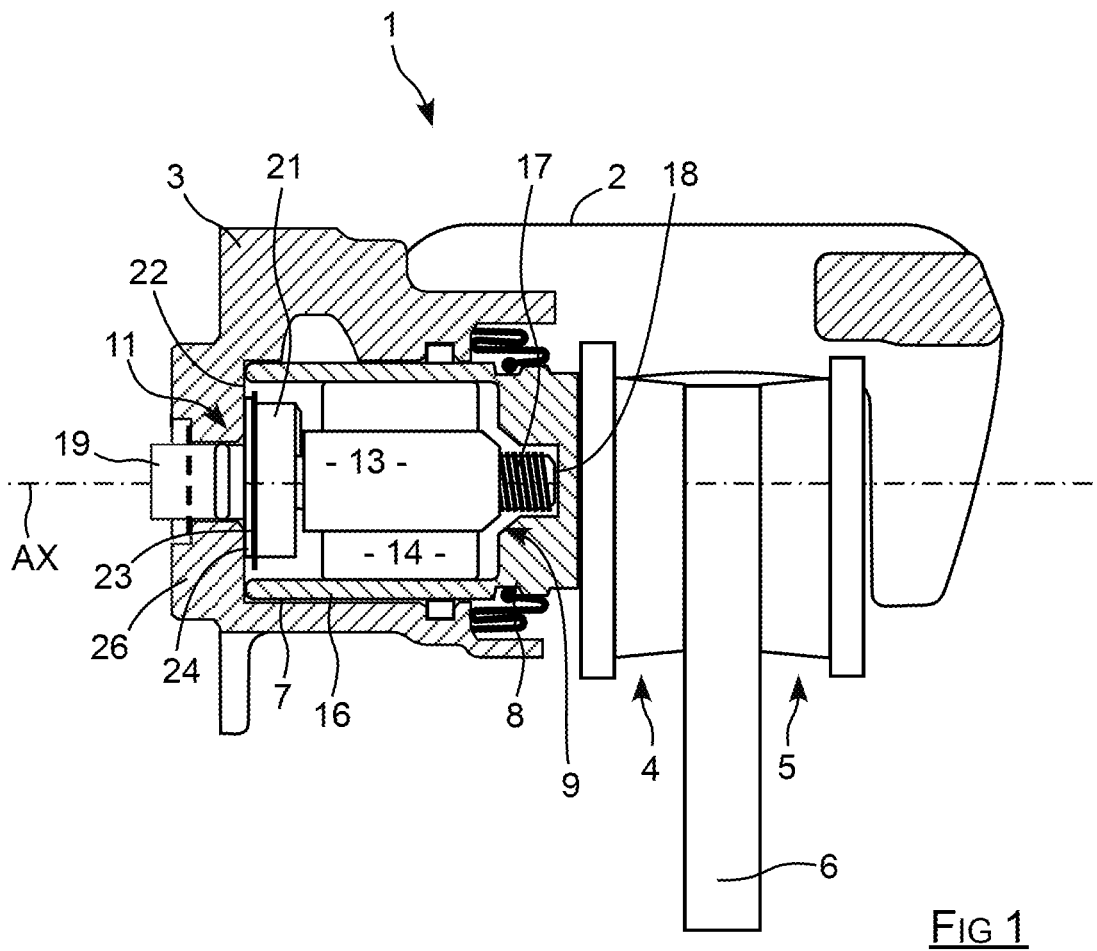
FIG. 1 is a view of the brake according to the invention with its caliper and disc along a cutting plane extending along the axis of the disc.

The electromechanical disc brake according to the invention that is shown in FIG. 1 while being referenced therein by 1 comprises a caliper 2 comprising a caliper body 3 carrying two pads 4 and 5 surrounding a disc 6, this caliper body 3 being equipped with an electromechanical actuator, not shown.

The caliper body comprises a cylindrical housing 7 extending between the actuator and one of the pads, in which there is housed a movable piston 8 having its head bearing on the pad 4, this piston 8 being able to move in translation in an axial direction AX and locked with respect to rotation about the axis AX with respect to the caliper body 3. This caliper body 3 is a single-piece element, for example made by foundry.

This piston 8 is moved or pressed against the pad 4 by means of a helical-connection mechanism 9 that is coupled to the actuator, not shown, the helical connection mechanism 9 being housed mainly in the piston 8.

This helical-connection mechanism 9 comprises a driver or drive member 11 screwed into a socket 13 that carries a ring 14 for locking this socket 13 with respect to rotation with respect to the piston 8. As can be seen in FIG. 1, the socket 13 and the ring 14 are situated in the internal space delimited by the cylindrical skirt 16 of the piston 8.

The driver 11 comprises more particularly a threaded body 17 having a free end 18 and an end 19 for coupling to the actuator, not shown, as well as a head 21 situated in the vicinity of the coupling end 19.

The head 21 is in the general form of a circular plate of significant thickness having an outside diameter less than the inside diameter of the skirt 16. This head 21 comprises a bearing face 23 oriented on the same side as the coupling end 19, and through which it is in abutment against a flat bottom 22 of the cylindrical housing 7, by means of a bearing washer 24.

As can be seen in FIG. 1, the coupling end 19 passes sealingly through a wall 26 of the caliper body 3 delimiting the bottom 22, via a hole formed in this wall 26, to allow coupling of the output shaft of the actuator, not shown, to this end 19, which thus projects outside the caliper body 3. In practice, the end 19 comprises a cavity of the hollow hexagonal type in which one end of the output shaft of the actuator, which is attached against the caliper body 3 on the external face of the wall 26, engages.

The flat bottom 22 corresponds to the internal face of the wall 26, and has a disc shape delimited externally by the cylindrical housing 7 guiding the piston 8 in translation. The wall 26 and the bottom 22 corresponding to its internal face are delimited internally, that is to say at their middle, by the central hole through which the end 19 passes.

Figure 2:
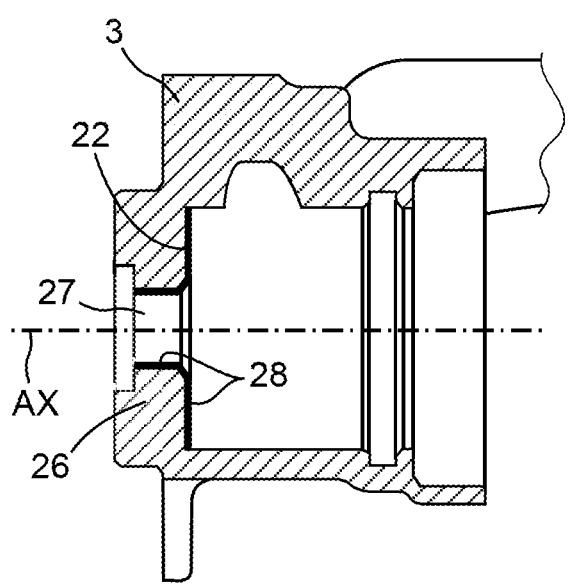
FIG. 2 is a view of a portion of the body of the brake caliper according to the invention.

As is clear from FIGS. 1 and 2, the wall 26 is situated on the same side as the electromechanical actuator of the brake, and its central hole is referenced 27 in FIG. 2, in which it appears more clearly.

A rotation of the driver 11 in the clamping direction, responding to a parking brake command, separates the socket 13 from the head 21 so that it presses the piston 8 against the pad 4 so as to generate a braking torque. Conversely, a rotation in the release direction, responding to a release command from the parking brake, moves the socket 13 towards the head 21 in order to reduce and cancel the braking torque.

The housing 7 and the mechanism 9 are moreover immersed in hydraulic liquid. An increase in the pressure of this liquid, responding to an actuation command from the service brake, thus presses the piston against the pad 4 in order to generate a braking torque. Conversely, a reduction in the hydraulic pressure, responding to a release command from the service brake, reduces the pressure exerted by the piston on the pad 4 in order to reduce or even cancel the braking torque.

The bearing face 23 of the head 21 of the driver 11 is provided with a non-friction coating, and the bearing washer 24 is manufactured from hard steel while having a suitable surface finish, that is to say having low roughness, in order to assist sliding of the bearing face 23 on the bearing washer 24 offering low resistance, that is to say low friction.

Alternatively or additionally, and as shown schematically in FIG. 2, the non-friction coating 28 is situated on the bottom 22 and/or at the internal face of the hole 27, in order to ensure absorption of the forces along the axis AX and rotation of the drive member 19 giving rise to minimal residual torque.

In other words, since the bearing washer 24 is manufactured or bought separately and attached in the mechanism, it makes it possible to offer a suitable bearing surface at the bearing face 23 of the driver 11 without having to machine or treat the bottom 22 of the housing 7, which is complex to treat or machine since it is fairly inaccessible. As it is mainly required of this washer that it have a suitable surface finish, that is to say that it is sufficiently smooth, its manufacturing or purchase cost remains low.

In the case where the bottom 22 has suitable flatness and surface finish, the bearing face 23 of the head 21 of the driver is advantageously bearing directly against the bottom 22.

The non-friction coating of the bearing face 23 is advantageously a coating composed of fluoropolymers, applied for example by electrostatic spraying of fluoropolymer micro-powder on the untreated bearing face of the driver 11, such a method being in particular described in the patent FR 3013240.

In practice, it has become clear that a fluoropolymer coating has both good performance and suitable longevity when it is stressed while being immersed in the hydraulic liquid of the braking control that by itself constitutes an aggressive environment.

The invention makes it possible to reduce the manufacturing cost of the electromechanical brake by dispensing with the additional cost caused by a ball thrust bearing or a roller thrust bearing, or the additional cost caused by a non-frictional washer up against a bearing washer for replacing such a ball thrust bearing.

This is because, although less expensive than ball or roller thrust bearings, the known non-frictional washers have despite everything a significant cost. They are manufactured from a metal sheet having a copper coating and a Teflon coating, which is in expensive to produce. This metal sheet is cropped in order to form washers, which cause losses giving rise to an additional cost.

REFERENCES 1 brake
2 caliper
3 caliper body
4 pad
5 pad
6 disc
7 housing
8 piston
9 mechanism
11 driver
13 socket
14 ring
16 skirt
17 threaded body
18 free end
19 coupling end
21 head
22 flat bottom
23 bearing face
24 bearing washer
26 wall
27 central hole
28 non-friction coating

The invention claimed is:

1. A brake caliper for an electromechanical brake comprising a single-piece caliper body comprising a housing enclosing a piston and a mechanism for moving this piston, the housing and the mechanism for moving the piston being configured to be immersed in hydraulic fluid, said mechanism for moving the piston comprising a drive member and a socket, said drive member being screwed into the socket, said socket carrying a ring for locking said socket with respect to rotation with respect to the piston, the ring extending axially along the socket, the socket and the ring being situated in an internal space delimited by the piston, said drive member comprising a threaded body and a head comprising a bearing face bearing against a bottom of the housing, and wherein a non-friction thrust bearing element is interposed between the bottom of the housing and the bearing face.

2. The brake caliper according to claim 1, wherein the non-friction thrust bearing element is a non-friction coating.

3. The brake caliper according to claim 2, the bottom of the housing being a face of a wall of the brake caliper body closing the housing of said brake caliper body, said wall comprising a central hole through which one end of the drive member passes, the central hole and the bottom of the housing each being provided with the non-friction coating.

4. The brake caliper according to claim 2, wherein the non-friction coating is a coating of the fluoropolymer type.

5. The brake caliper according to claim 1, wherein the non-friction thrust bearing element comprises a metal washer interposed between the bearing face of the head of the drive member and the bottom of the housing.

6. A method for assembling a brake caliper according to claim 1, comprising:
  introducing, into the housing of the single-piece caliper body, an assembly comprising the piston and its drive member.

7. The brake caliper according to claim 1, the ring extends along a majority of an axial length of the socket.

8. An electromechanical disc brake comprising a brake caliper comprising a single-piece caliper body comprising a housing enclosing a piston and a mechanism for moving this piston, the housing and the mechanism for moving the piston being configured to be immersed in hydraulic fluid, said mechanism for moving the piston comprising a drive member and a socket, said drive member being screwed into the socket, said socket carrying a ring for locking said socket with respect to rotation with respect to the piston, the ring extending axially along the socket, the socket and the ring being situated in an internal space delimited by the piston, said drive member comprising a threaded body and a head comprising a bearing face bearing against a bottom of the housing, and wherein a non-friction thrust bearing element is interposed between the bottom of the housing and the bearing face.

* * * * *